H. F. D. SCHWAHN.
PROCESS FOR THE PRODUCTION OF ALUMINUM.
APPLICATION FILED JUNE 1, 1915.
1,171,360.
Patented Feb. 8, 1916.
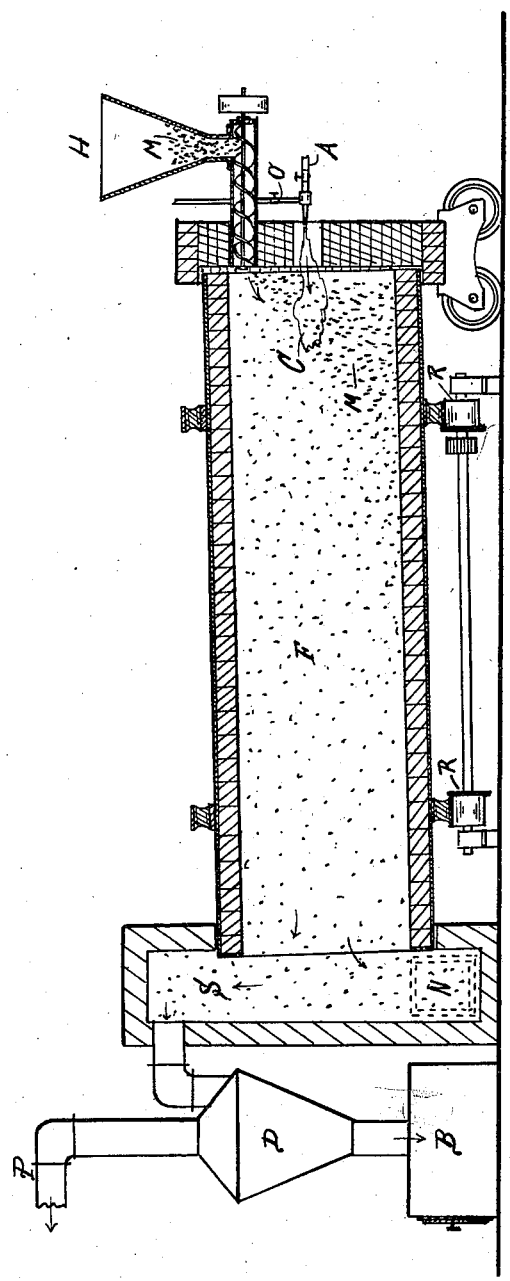

UNITED STATES PATENT OFFICE.

HEINRICH F. D. SCHWAHN, OF BELLEVILLE, ILLINOIS.

PROCESS FOR THE PRODUCTION OF ALUMINUM.

1,171,360.

Specification of Letters Patent.  Patented Feb. 8, 1916.

Application filed June 1, 1915. Serial No. 31,574.

*To all whom it may concern:*

Be it known that I, HEINRICH F. D. SCHWAHN, a citizen of the United States, and resident of the city of Belleville, in the county of St. Clair and State of Illinois, have invented certain new and useful Improvements in Processes for the Production of Aluminum, of which the following is a specification.

This invention contemplates the use of sulfate of aluminum $Al_2(SO_4)_3 + 16H_2O$ for the production of a combination of alumina with carbon and the subsequent reduction of the resultant carbonized alumina.

The aluminum sulfate may be made from any aluminous material or ore by any known process but I prefer to have it made by my "method of preparing aluminum sulfate," Letters Patent No. 1,077,309, Nov. 4, 1913, whereby the finished sulfate for the production of aluminum is mixed with carbonaceous material, though not absolutely necessary it is desirable. This process with apparatus is designed for large commercial operations with a view to connect it with the production of aluminum from aluminum sulfate by commercial processes of my invention, to utilize the sulfur gases given off by the aluminum sulfate to be used again in the production of more aluminum sulfate from any aluminous material or ore, one of the economical features of the process under consideration.

The aluminous material or ore is ground and treated with sulfuric acid by one or the other known processes and the resultant sulfate of aluminum separated in form of a solution with water. This solution is then evaporated to its extreme limit to remove all or at least most of its free water content. And I preferably carry out this evaporation in a vacuum pan. After discharging the resultant concentrated sulfate of aluminum from the vacuum pan and cooling I crush and pulverize the mass to pass through about a 50-60 mesh screen. This powdered mass I charge then into a revolving calciner, the usual iron cylinder lined within with firebrick, as usually used for the clinker burning in cement plants, and heat the sulfate of aluminum by directly applied firing, suitably with producer-gas, natural gas or any other gas or fuel having hydrocarbons or carbon and hydrogen in its composition, to about an orange red heat, whereby the water of combination and the bulk of the sulfur content is driven off mechanically as $SO_3$ and $SO_2$ from the aluminum sulfate, while the remainder of the acid radical of the sulfate is reduced to sulfur, it is thought, by the amorphous carbon—soot—a derivation from the incomplete combustion of the fuel burned during this operation, and evolves and burns to $SO_2$, when the liberated alumina will float in the prevailing hot atmosphere and gathers more soot mechanically by surface attraction.

The chemical part of this process may be approximately expressed by the following equation:

$$8Al_2(SO_4)_3 + 12C = 8Al_2O_3 + 24SO_2 + 12CO_2.$$

This reaction is introduced merely as indicating the probable course of the reduction of the sulfate of aluminum to alumina, not considering its combination with carbon mechanically formed. Meanwhile the liberated alumina is carried off with said sulfur gases and the waste gases from the combustion of the fuel, into a suitably arranged annexed chamber or chambers to said calciner, in form of gray dust from its adhering amorphous carbon above referred to, and where it is allowed to deposit for future use, while the waste gases from the combustion with the containing sulfur gases are led away for the recovery of said sulfur gases, consisting chiefly of $SO_2$ and $SO_3$, for use in the sulfate process first above referred to, or for the production of sulfuric acid by the chamber process suitable for use in any other process of sulfate making.

Having thus produced alumina viz; the oxid of aluminum incidentally in intimate combination with some carbon but substantially free from iron, silica, sodium, or potassium and titanic acid, I may use the same in the condition as it is for the production of aluminum by any method known now or hereafter.

The annexed drawing represents the revolving calciner or furnace F, in diagrammatic section upon the usual driving wheels R, R, and, as herein shown heated by burning oil, for instance crude petroleum supplied by the pipe O, to the burner A, also supplied with air or steam to force the oil in form of a spray into the furnace and burned, as usually practised. The result is the flame C, into which the material M, viz: the ground and nearly anhydrous sulfate of alumina is charged by means of the feeding device connected with the hopper H. Then the settling chamber S, with the door N, is to take care of most of the resultant alumina, while the resultant sulfurous vapors incidentally carry off some of said alumina; they are permitted to pass through the dust collector D, to deposit their alumina content into box B, and the alumina free spent gases make then their exit through the pipe P, into suitable direction for their recovery and future use to produce more sulfate or their converting into sulfuric acid as usually practised.

Having described the application of my process commercially, what I claim as of my invention in said process is as follows:

1. The hereindescribed process of producing alumina in a finely divided state in combination with carbon for the production of aluminum, which consists in subjecting aluminum sulfate within a suitable container to a current of hot gases resultant from the combustion of a directly fired fuel having carbon and hydrogen in its composition, while agitating said sulfate by revolving said container, substantially as set forth.

2. The hereindescribed process of producing alumina in a finely divided state in combination with carbon for the production of aluminum, which consists in subjecting aluminum sulfate to heat and to the action of the moving gases resultant from the combustion of a suitable fuel by its direct firing upon said sulfate while revolving its container to agitate the reaction mass, dehydrate and reduce said sulfate of aluminum to alumina and combine it with carbon and suspend said alumina in said moving gases to be carried off for its recovery, substantially as set forth.

3. The hereindescribed process of producing alumina in a finely divided state and in combination with carbon for the production of aluminum, which consists in subjecting aluminum sulfate in a concentrated and powdered condition to the action of the hot products from the combustion of suitable fuels which includes gases having carbon and hydrogen in their composition, by direct firing upon said sulfate, which is suitably agitated by the revolving of its container to expose continuously said sulfate to the hot products of said combustion to liberate progressively the alumina in form of finely divided particles to combine with some of the amorphous carbon resultant from said combustion and become suspended in the resultant spent gas which is permitted to pass off continuously from said container for the recovery of its alumina and sulfur content, substantially as set forth.

HEINRICH F. D. SCHWAHN.

Witnesses:
BEATRICE FITZGERALD,
M. R. DE FRANCE.